United States Patent [19]

Rovner

[11] Patent Number: 5,189,356
[45] Date of Patent: Feb. 23, 1993

[54] VOLTAGE DRIVE AMPLIFIER WITH VOLTAGE FEEDBACK

[75] Inventor: Michael S. Rovner, San Jose, Calif.

[73] Assignee: Symbol Technologies, Inc., Bohemia, N.Y.

[21] Appl. No.: 639,822

[22] Filed: Jan. 10, 1991

[51] Int. Cl.[5] .............................................. G05B 19/40
[52] U.S. Cl. ................................................... 318/685
[58] Field of Search ........................ 318/696, 685, 627; 350/6.6; 235/467

[56] References Cited

U.S. PATENT DOCUMENTS

| | | | |
|---|---|---|---|
| 3,727,121 | 4/1973 | Rich | 318/696 |
| 4,319,175 | 3/1982 | Leenhouts | 318/696 |
| 4,675,590 | 6/1987 | Pellegrieno | 318/696 |
| 4,984,857 | 1/1991 | Yeung et al. | 350/6.6 |
| 4,992,717 | 2/1991 | Marwin | 318/696 |

Primary Examiner—William M. Shoop, Jr.
Attorney, Agent, or Firm—Scully, Scott, Murphy & Presser

[57] ABSTRACT

A voltage drive circuit for driving a stepping motor for a laser scanning mirror in a laser bar code reader assembly. The voltage drive circuit provides a highly damped, low q drive in which resonance is virtually eliminated and wherein damping of the rotor is proportional to its angular velocity, and also the position of the rotor precisely follows an input voltage signal driving the motor. The stepping motor includes a rotor, a stator, a center-tapped AC winding and a DC winding. The motor drive circuit comprises a triangular waveform generator for generating a periodic triangular voltage signal. A driving circuit for an AC winding receives the periodic triangular voltage signal as an input, and includes a voltage feedback circuit in which the voltage across the AC winding is compared with and caused to follow the input voltage signal driving the AC winding. The drive circuit for the AC winding includes a first noninverting operational amplifier and a second inverting operational amplifier for driving respectively first and second phase sides of the AC winding. Each of the first and second operational amplifiers receive the triangular voltage signal as a first input signal and also receives as a second input a feedback signal representing respectively the voltage across the first and second phase sides of the AC winding. A drive circuit for the DC winding utilizes a voltage feedback signal obtained from the AC winding for compensating for an angular offset between the AC and DC windings.

13 Claims, 3 Drawing Sheets

VOLTAGE DRIVE AMPLIFIER WITH VOLTAGE FEEDBACK

BACKGROUND OF THE INVENTION

1. Field of the Invention

The present invention relates generally to a voltage drive circuit for driving a stepping motor for a laser scanning motor in a laser bar code reader assembly, and more particularly pertains to a voltage drive circuit as described for driving a stepping motor in a manner in which the position of the rotor precisely follows an input voltage signal driving the motor by utilization of multiple feedback loops and microstepping techniques.

2. Discussion of the Prior Art

The increased use of bar code symbols to identify products, particularly in retail businesses, has resulted in the development of various bar code reading systems. Many users of bar code readers require portable hand-held scanners which place a premium on small size, lightweight and low power consumption requirements for the devices. One such system is a laser scanning bar code reading system as described in U.S. Pat. No. 4,496,831, commonly assigned to the same assignee as the present patent application.

The laser scanning system disclosed in U.S. Pat. No. 4,496,831 includes a portable hand-held scanning head which may be embodied in various shapes but preferably has a gun shaped housing made of lightweight plastic. A handle and barrel portion are provided to house the various components of the scanning head therein. Within the barrel portion are mounted a miniature light source, a miniature optic train including focusing lenses and a scanning system for directing light from the light source across a bar code symbol, and miniature sensing means for detecting reflected light from the bar code symbol being scanned.

The miniature light source can comprise a laser tube such as a coaxial helium neon laser tube, or preferably a semiconductor laser diode which is considerably smaller and lighter than a laser tube, thus reducing the required size and weight of the scanning head and making the scanning head easier to handle and more maneuverable. Light generated by the light source passes through the optic train which directs the beam onto the scanning system which is mounted within the barrel portion of the scanning head. The scanning system sweeps the laser beam across the bar code symbol and comprises at least one scanning stepping motor for sweeping the beam lengthwise across the symbol, and may comprise two motors wherein the second motor sweeps the beam widthwise across the symbol. Light reflecting mirrors are mounted on the motor shaft or shafts to direct the beam through the outlet port to the symbol.

A sensing circuit then detects and processes the light reflected from the symbol and generally comprises a photodetector element such as a semiconductor photodiode. The user positions the hand-held unit so the scan pattern traverses the symbol to be read, and the photodetector element produces serial electrical signals to be processed for identifying the bar code. A signal processing circuit for a bar code produces a signal which is directed to a bar pattern decoder circuit for decoding the bar pattern.

The reader unit can have a movable trigger employed to allow the user to activate the light beam and detector circuitry when pointed at the symbol to be read, thereby conserving battery life if the unit is self-powered. The lightweight plastic housing contains the laser light source, the detector, the optics, signal processing circuitry, a CPU and a battery. The reader is designed to be aimed at a bar code symbol by the user from a position where the reader is spaced from the symbol, i.e., not touching the symbol or moving across the symbol. Typically, this type of hand-held bar code reader is specified to operate in the range of perhaps several inches.

The prior art has generally utilized a current drive circuit for driving the stepping motor in a laser bar code reader scanner. In such prior art current drive circuits, the connections to the AC and DC windings of the stepping motor are reversed from those of a voltage drive circuit as illustrated in FIG. 1 herein and as explained hereinbelow. Namely, the drive voltage potential is introduced to the center tap of the AC winding 14, and the opposite ends of each phase of the AC winding are grounded, and the ground and potential sides of the DC winding 18 are also reversed, in a manner opposite to that shown in FIG. 1 herein. In a prior art current drive circuit, the current through the AC winding 14 is detected in a current feedback loop to ensure that the current through the AC winding follows an input current. In contrast thereto, in a voltage drive circuit as taught by the present invention, the voltage through the AC winding 14 is detected in a feedback loop to ensure that the voltage across the winding follows the input voltage.

The advantages of the prior art current drive circuits include a reduction of the phase delay of the motor winding inductance, which allows a start of scan (SOS) timing signal to be generated directly from an oscillator signal. Moreover, the temperature rise in the motor winding is compensated, and Vbat-0.7 v can be supplied to the motor windings. However, prior art current drive circuits include a number of disadvantages including an exaggeration of the resonance of the motor. The system is high q (q is used herein as the classical measure of the quality or resonance as applied to resonant systems, both electrical and mechanical) and the frequency is sensitive to drive amplitude, motor efficiency and mirror mass. The arrangement is sensitive to motor efficiency, to load mass and inertia, to bearing friction and damping, and to drive frequency shifts. Moreover, the nonlinear restoring force of the DC winding causes "blooming." In summary, the system needs to be mechanically tuned to work properly.

The advantages and disadvantages of a current drive circuit make it suitable for driving a stepping motor with sleeve bearings, which provide friction and damping for the motor. However, a current drive circuit is not suitable for driving a stepping motor with ball bearings, which provide negligible friction and damping for the motor, and also advantageously have a very long service life. The high damping and low q provided by the voltage drive circuit of the present invention make it much more suitable for driving a stepping motor with ball bearings.

SUMMARY OF THE INVENTION

Accordingly, it is a primary object of the present invention to provide a voltage drive circuit for driving a stepping motor for a laser scanning mirror in a laser bar code reader assembly.

A further object of the subject invention is the provision of a voltage drive circuit as described for driving stepping motors in a manner in which the position of the rotor precisely follows an input voltage signal driving the motor by utilization of multiple feedback loops and microstepping techniques.

The voltage drive circuit of the present invention differs from prior art designs by utilizing a novel drive, novel feedback controls and novel microstepping compensation. The basis for this design is the need to drive ball bearing stepping motors without making changes to the mirror assembly, which the prior art current drive design was not able to accomplish in a stable manner at the required amplitude. It is also important to utilize a circuit design which keeps the circuitry board space to a minimum.

In accordance with the teachings herein, the present invention provides a voltage drive circuit as described providing a highly damped, low q (q is used herein as the classical measure of the quality or resonance as applied to resonant systems, both electrical and mechanical) drive in which resonance is virtually eliminated and wherein damping of the rotor is proportional to its angular velocity, and also the position of the rotor precisely follows an input voltage signal driving the motor. The voltage drive circuit can operate at any frequency including natural resonance frequencies. Moreover, the voltage drive circuit compensates for motor efficiency variations, compensates for motor bearing load changes, compensates for motor temperature variations, and can operate with any normal mirror load mass. The disadvantages of the voltage drive circuit are minimal. The phase delay of the motor inductance makes SOS timing compensation necessary, and the voltage drive is limited to 6 v p-p.

A preferred embodiment provides a voltage drive circuit for a stepper motor in a laser scanning device, with the stepper motor having a rotor, a stator, a center-tapped AC winding and a DC winding. The motor drive circuit comprises a triangular waveform generator for generating a periodic triangular voltage signal. The driving circuit for the AC winding receives the periodic triangular voltage signal as an input and includes a voltage feedback circuit in which the voltage across the AC winding is compared with and caused to follow the input voltage signal driving the AC winding. The driving circuit for the DC winding generates a DC winding voltage signal.

In greater detail, the center tap of the AC winding is connected to ground, and the drive circuit for the AC winding suppresses back emf voltages generated at the AC winding, in a manner as described hereinbelow. The drive circuit for the AC winding includes a first noninverting operational amplifier and a second inverting operational amplifier for driving respectively first and second phase sides of the AC winding. Each of the first and second operational amplifiers receives the triangular voltage signal as a first input signal and also receives as a second input a feedback signal representing respectively the voltage across the first and second phase sides of the AC winding. The circuit also includes first and second low output impedance emitter follower drives coupled respectively to the outputs of the first and second operational amplifiers for driving respectively the first and second phase sides of the AC winding. The low impedance drives relate to high damping and low q operation of the rotor as follows. The low impedance output presented by the emitter follower drive transistors Q1 and Q2 to the two phases of the AC winding 14 relates directly to damping of the motor. During operation of the motor, as the permanent magnets on the rotor are rotated by the AC winding 14, the changing magnetic flux caused by the rotating magnets induces a voltage in the AC winding 14, which is known as the back emf voltage. The two phases of the AC winding are provided with low impedance loads by the low impedance drive transistors such that during rotation of the rotor, the back emf voltage generated across the windings is dissipated across the low impedance loads provided by the low impedance drive transistors. The low impedance loads cause the rotor to be highly damped and resist any rotation, and also result in dissipation and suppression of the generated back emf voltage. Moreover, the back emf voltage generated across the AC winding increases at increased rotational velocities because the magnetic flux changes faster at higher rotational velocities. Accordingly, the increased back emf at higher rotational velocities also causes an increase in damping of the rotor in proportion to its angular velocity.

The drive for the DC winding utilizes a voltage feedback signal obtained from the AC winding for compensating for an angular offset between the AC and DC windings, and includes an operational amplifier for combining a DC voltage drive signal with the voltage feedback signal. In the feedback circuit, a voltage feedback signal is taken from the AC winding, which is used to compensate for the offset centering between the AC and DC windings. The drive circuit for the DC winding also a low output impedance drive, and accordingly also provides damping of the rotor and suppression of generated back emf voltages in a manner as explained hereinabove with respect to the AC windings.

The triangular waveform generator operates by sinking and sourcing a direct current input to a capacitor, and includes a comparator coupled to a resistor divider network for scaling down the comparator output signal which is applied to an operational amplifier, the output of which periodically charges a temperature compensated capacitor.

A start of scan delay compensating circuit provides delay compensation for phase delays caused by the motor, such as phase delays caused by the winding inductance and rotor/load inertia.

A motor failure detecting circuit detects when the stepper motor is in a nonoperative state to limit the power input to a laser in the laser scanning device when the motor is in a nonoperative state. The motor failure detecting circuit operates by detecting when the back emf voltage of the stepping motor is within a negative voltage range.

BRIEF DESCRIPTION OF THE DRAWINGS

The foregoing objects and advantages of the present invention for a voltage drive circuit may be more readily understood by one skilled in the art with reference being had to the following detailed description of a preferred embodiment thereof, taken in conjunction with the accompanying drawings in which.

DETAILED DESCRIPTION OF THE DRAWINGS

Figure 1A:
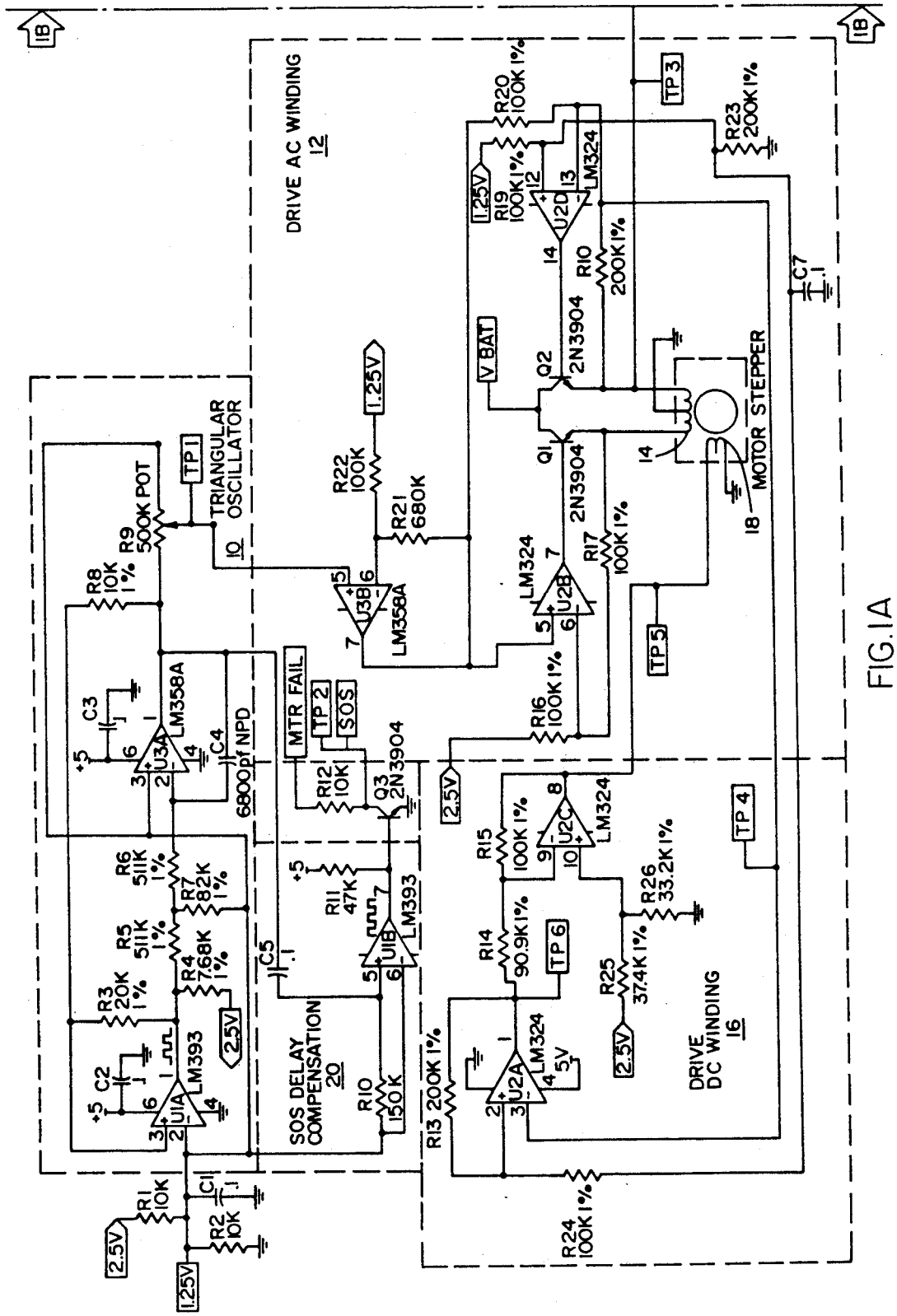
FIGS. 1A and 1B illustrate an electrical schematic of an exemplary embodiment of a voltage drive circuit constructed pursuant to the teachings of the present invention.
Figure 1B:
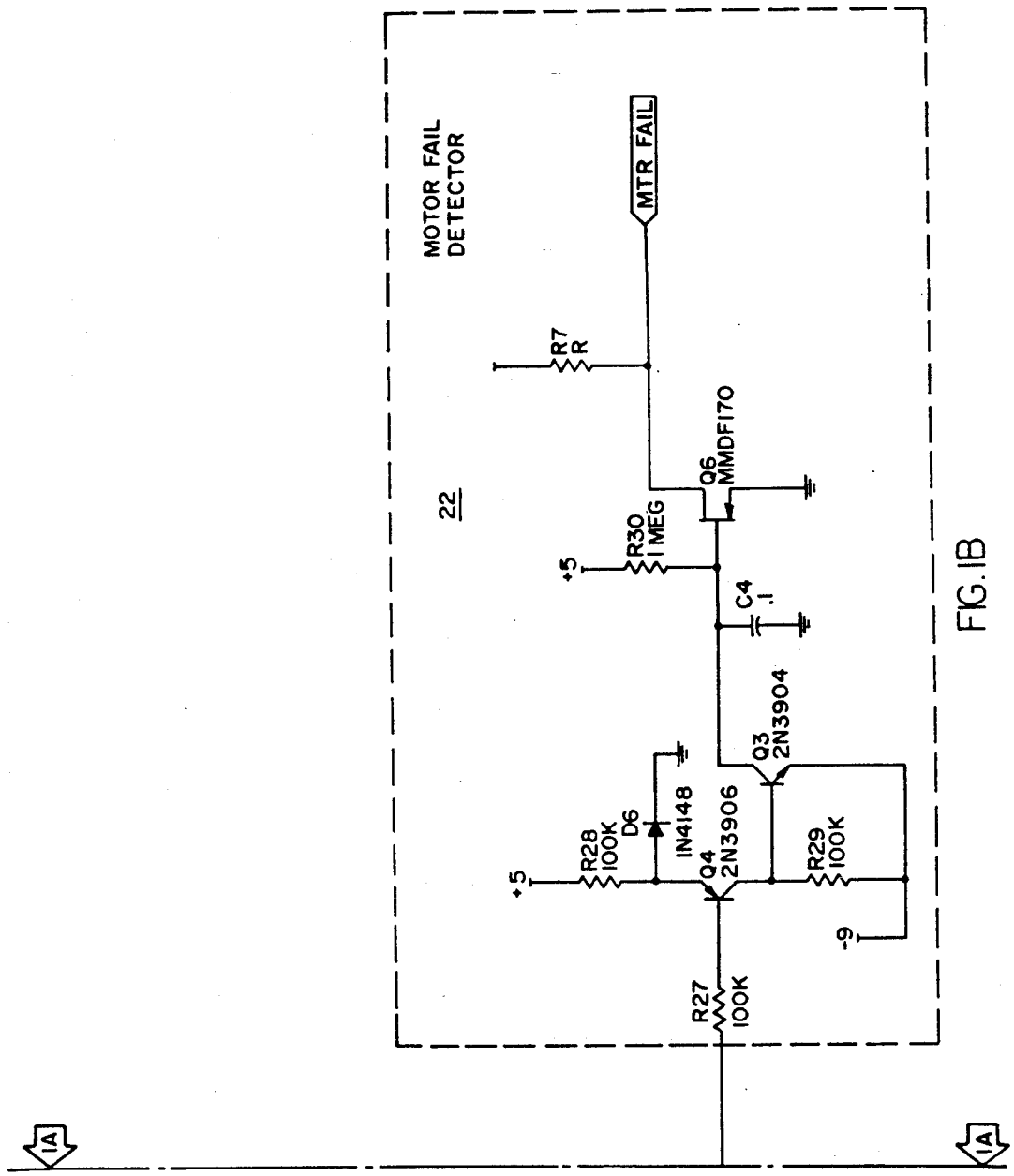

Referring to the drawings in detail, the voltage motor drive circuitry comprises the following functional component blocks: a triangular waveform generator 10; drive circuitry 12 for AC windings 14; drive circuitry 16 for DC windings 18; start of scan (SOS) compensation circuitry 20; and motor failure detection circuitry 22.

The following is a description of the circuit functions and their differences from other circuit designs.

A triangular waveform is generated at output TP1 by a triangular waveform generator or oscillator 10 across a capacitor C4 by sinking and sourcing a direct current at an input to the capacitor C4 by a comparator U1A and a resistor divider network R5, R6, R7. The addition of the novel resistor divider network allows the use of a temperature compensated 6800 pf NPO/COG type capacitor for C4, which decreases the frequency shifts that occur in prior art circuits using a 0.1 uf X7R type capacitor, caused by high temperature during wave-soldering which affect the magnitude of the capacitance value thereof.

In operation of the triangle waveform generator circuit, comparator U1A, which is connected in a feedback circuit, produces a square wave output signal, and the novel resistor divider network R5, R6 and R7 scales down the voltage of the square wave signal because of the voltage drop across resistor R7, which allows a smaller temperature compensated capacitor to be used for C4. An NPO/COG type of capacitor does not change its capacitance value when subject to high temperature such as during a wave soldering operation, as happens to a prior art X7R type of capacitor. The square wave signal is then converted to a triangular waveform by op amp U3A, which is adjusted in amplitude by potentiometer R9, and passed as an output signal at TP1.

In the drive circuitry 12 for the AC windings 14, the center tap of the AC windings 14 is connected to ground (instead of VBAT as in a prior art current drive circuit), with two low output impedance emitter follower driver transistors Q1 and Q2 connected to each phase (opposite sides of AC winding 14). Voltage feedback and low output impedance drive (instead of high output impedance and current sensing) was chosen of the rotor operation of the rotor to provide for damping of the rotor in proportion to its angular velocity, and also suppression of generated back emf voltages. The low impedance drives relate to high damping and low q operation of the rotor as follows. The low impedance output presented by the emitter follower drive transistors Q1 and Q2 to the two phases of the AC winding 14 relates directly to damping of the motor. During operation of the motor, as the permanent magnets on the rotor are rotated by the AC winding 14, the changing magnetic flux caused by the rotating magnets includes a voltage in the AC winding 14, which is known as the back emf voltage. The two phases of the AC winding are provided with low impedance loads by the low impedance drive transistors such that during rotation of the rotor, the back emf generated across the windings is dissipated across the low impedance loads provided by the low impedance drive transistors. The low impedance loads cause the rotor to be highly damped and resist any rotation, and also result in dissipation and suppression of the generated back emf voltage. Moreover, the back emf voltage generated across the AC winding increases at increased rotational velocities because the magnetic flux changes faster at higher rotational velocities. Accordingly, the increased back emf at higher rotational velocities also causes an increase in damping of the rotor in proportion to its angular velocity. Operational Amplifiers U2B and U2D operate at unity gain and are driven by comparator U3B, which supplies the necessary gain (7 x) and buffering for the amplitude adjustment potentiometer R9.

In operation of the drive circuit 12 for the AC winding 14, the triangular waveform input is amplified by op amp U3B to produce an amplified triangular waveform which is directed as inputs to op amps U2B and U2D. Op amp U2B is noninverting, and passes the top half of each triangular waveform through amplifier Q1 to drive one phase of the AC winding 14. Op amp U2D is inverting and passes the bottom half of each triangular waveform through amplifier Q2 to drive the other phase of the AC winding 14. Thus during each triangular waveform, first op amp U2D drives the right phase (in the drawing) of AC winding 14 during the first half of the triangular waveform, and then op amp U2B drives the left phase of the AC winding 14 during the second half of the waveform. The voltage feedback for op amp U2B is through resistor R17, with the feedback causing the voltage output to follow the applied voltage input. The voltage feedback for op amp U2D is through resistor R10, which also operates in a manner as just explained. The voltage feedback circuits and high damping cause the position of the stepping motor to follow very precisely the triangular waveforms applied thereto, which is not the case for a current feedback circuit wherein the AC windings are effectively opened during operation.

In the drive circuitry 16 for the DC windings 18, U2C provides a low output impedance drive for the DC windings 18, which is connected to ground (instead of VBAT as in a prior art current drive circuit). Voltage feedback and low impedance drive was chosen to provide to provide for damping of the rotor in proportion to its angular velocity to provide low q operation, and also suppression of generated back emf voltages. Feedback for the DC windings 18 from the AC windings is taken from the (-) input node of U2D and is used as a voltage feedback signal to compensate for the offset centering between the AC and DC windings.

In operation of the drive circuit 16 for the DC winding 18, a DC voltage is applied to the DC winding 18, and has a periodic voltage feedback signal superimposed thereon to compensate for the offset centering between the AC and DC windings of the motor, which is a commercially available nonlinear stepping motor which is driven in oscillation (not rotation) to oscillate the laser scanning mirror. In the commercial stepping motor, the AC and DC windings are offset by approximately 22°, which would normally result in a noncentered scanning oscillation. The superimposed voltage feedback signal causes a centered scanning oscillation, and effectively varies the detent stopping position of the motor rotor to center it and causes the motor rotor to provide a centered response. The superimposed microstepping voltage is taken from the feedback loop for U2D across resistor R10 and is directed as one input to op amp U2A. The output of op amp U2A is directed as one input to op amp U2C. The second input to op amp U2C is a DC voltage, on which the microstepping voltage is superimposed by op amp U2C.

In the start of scan (SOS) compensation circuitry 20, a capacitor C5 and resistor R10 provide a delay to a comparator U1B for proper SOS timing. The delay is necessary to compensate for the phase delay caused by the drive winding inductance and stator/load inertia. The SOS circuit 20 provides an output at TP2 which is directed to the laser scanner decoder circuit which decodes the detected bar code pattern. The output of SOS circuit 20 provides the decoder circuit with a signal indicating the start of each scan. The input to SOS circuit 20 is the triangular waveform output of the triangular waveform generator 10 taken at the output of op amp U3A. The signal is directed to capacitor C5 which provides a delayed input to comparator U1B, the output of which is a square wave signal directed to amplifier Q3 and then to the SOS output, which provides a time delayed output proportional to the time delay introduced by the voltage drive circuit.

The motor fail detection circuitry 22 detects the back emf voltage at TP3 from one phase of the motor below ground within a preset voltage range including all voltages below ground. Transistor Q4 detects any voltage signal below ground, and transistor Q5 charges capacitor C6, which keeps FET transistor Q6 off. This circuit provides an output to the laser drive circuitry to limit the laser output to only 25% power (idle mode) if the motor is disconnected or fails. The input to motor fail detection circuit 22 is taken from the output of transistor Q2 of the AC winding drive circuit, which is the bottom half of each triangular waveform. The transistor Q2 conducts only when the triangular waveform is above ground, and is nonconductive when it is below ground. When Q2 is nonconductive, the input to the motor failure detector circuit is the back emf voltage of the motor, which is the signal detected by the motor failure detector circuit 20. The transistor Q4 amplifies any voltage below ground voltage, and drives transistor Q5, which in turn drives FET transistor Q6, which produces a one or high signal when a motor failure is detected.

In frequency response tests, the frequency responses of ball bearing and sleeve bearing motors were measured using a velocity transducer coupled to the mirror. The motors were driven using a microstepping circuit with a prior art current drive circuit and the microstepping circuitry described hereinabove with a voltage drive circuit. Each circuit was driven with a triangular wave generator. The frequency response tests indicated amplitude peaking in the current drive arrangement due to resonance. In contrast thereto, the voltage drive arrangement of the present invention demonstrated a flat response of a well-behaved damped system.

In temperature tests, temperature testing was conducted of the same circuitry and ball bearing motors at nominal room temperature (25° C.) and at an elevated temperature of 45° C., and measured to be virtually identical. The voltage drive of the present invention was self-compensating due to the feedback controls on both the AC and DC windings. The oscillator is temperature compensated by the use of an NPO type capacitor.

In summary, in all of the testing that was conducted between the two circuits, the inherent stability of the damped voltage drive microstepping circuitry did not require any circuit adjustments to enable it to work and function properly for any motor and mirror loading. The circuit uses less DC current and consumes the same amount of board space. The prior art current driving arrangement was found to be slightly unstable at large amplitudes with typical sleeve bearing motors and unstable with ball bearing motors, unless the DC current and mirror mass was increased. In conclusion, a current drive circuit has advantages when used in closed loop systems by reducing phase shift and increasing bandwidth/phase gain margins, but is undesirable in open loop systems because of the increased amplitude at resonance.

Figure 2:
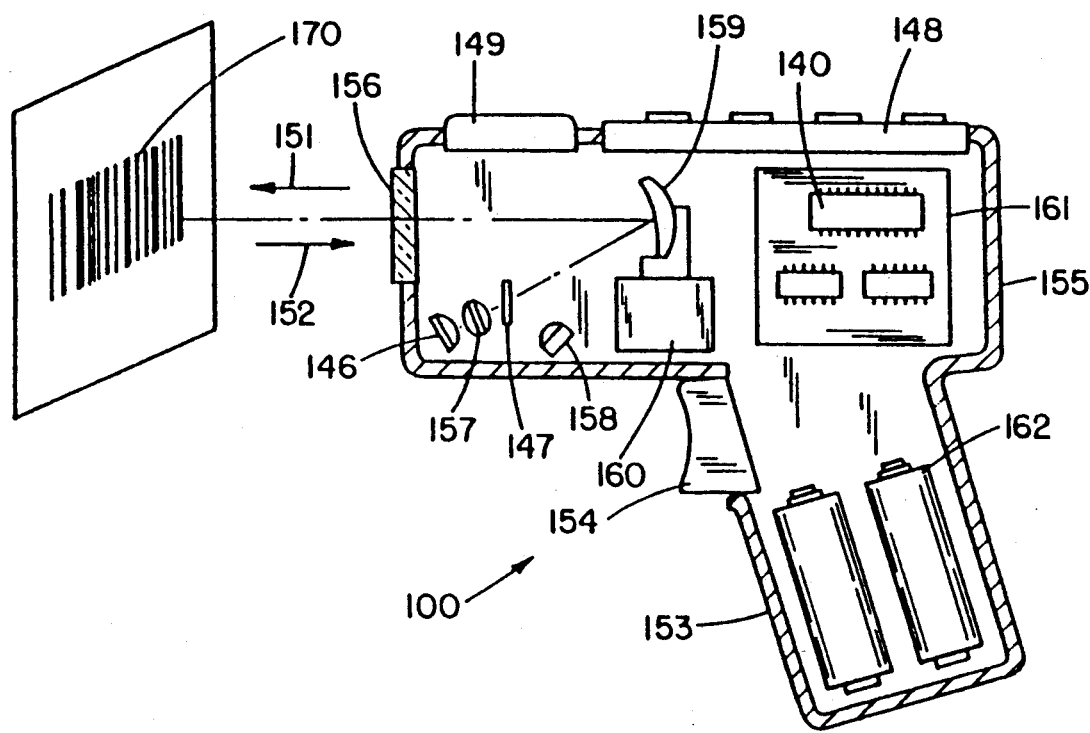
FIG. 2 illustrates a highly simplified embodiment of one type of bar code reader which can be utilized in association with the voltage drive circuit of the present invention.

FIG. 2 illustrates a highly simplified embodiment of one type of bar code reader that may be utilized in association with the voltage driver circuit of the present invention. A reader 100 may be implemented in a hand-held scanner, as illustrated, or a desk-top workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 2 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 2. These U.S. Pat. Nos. 4,760,248, 4,896,026 and 4,409,470 are incorporated herein by reference, but the general design of such devices will be briefly described here for reference.

Referring to FIG. 2 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected light 152 from the symbol is detected by a light-responsive device 158 in the reader unit, producing serial electrical signals to be processed and decoded for reproducing the data represented by the bar code.

In a preferred embodiment, the reader unit 100 is a gun shaped device having a pistol-grip type of handle 153, and movable trigger 154 is employed to allow the user to activate the light beam 151 and detector circuitry when pointed at the symbol to be read, thereby saving battery life if the unit is self-powered. A light-weight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

As further depicted in FIG. 2, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, driven by the voltage drive circuit of the present invention, which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

While several embodiments and variations of the present invention for a voltage drive amplifier with voltage feedback are described in detail herein, it should be apparent that the disclosure and teachings of the present invention will suggest many alternative designs to those skilled in the art.

What is claimed is:

1. A voltage drive circuit for a stepper motor in a laser scanning device, comprising:
   a. said stepper motor having a rotor, a stator, a center-tapped AC winding to which an AC drive signal is applied and a DC winding to which a DC drive signal is applied;
   b. a triangular waveform generating means for generating a periodic triangular voltage signal;
   c. means for driving said AC winding with said periodic triangular voltage signal, including a voltage feedback circuit in which a voltage across the AC winding is compared with the input periodic triangular voltage signal driving the AC winding and the voltage across the AC winding is caused to follow the input periodic triangular voltage signal driving the AC winding; and
   d. means for driving said DC winding with a DC winding voltage signal.

2. A voltage drive circuit as recited in claim 1, wherein the center tap of said AC winding is connected to ground.

3. A voltage drive circuit as recited in claim 1, wherein said means for driving said AC winding includes a low impedance drive circuit, which provides damping of the rotor and also suppression of back emf voltages generated at said AC winding.

4. A voltage drive circuit as recited in claim 1, wherein said means for driving said AC winding includes a first noninverting operational amplifier and a second inverting operational amplifier for driving respectively first and second phase sides of the AC winding, each of said first and second operational amplifiers having the triangular voltage signal as a first input signal and having a second input signal representing respectively the voltage across the first and second phase sides of the AC winding.

5. A voltage drive circuit as recited in claim 4, wherein said means for driving said AC winding further includes first and second low output impedance emitter follower drives coupled respectively to the outputs of said first and second operational amplifiers for driving respectively the first and second phase sides of the AC winding.

6. A voltage drive circuit as recited in claim 1, wherein said means for driving said DC winding includes means for utilizing a voltage feedback signal obtained from said AC winding for compensating for an angular offset between said AC and DC windings.

7. A voltage drive circuit as recited in claim 6, wherein said means for driving said DC winding includes an operational amplifier for combining a DC voltage signal with said voltage feedback signal.

8. A voltage drive circuit as recited in claim 6, wherein said means for driving said DC winding includes means for providing a low output impedance drive which provides damping of the rotor and also suppression of back emf voltages generated at said DC winding.

9. A voltage drive circuit as recited in claim 1, wherein said triangular waveform generating means comprises means for sinking and sourcing a direct current input to a capacitor, including a comparator coupled to a resistor divider network for scaling down the comparator output signal which is applied to an operational amplifier, the output of which periodically charges the capacitor.

10. A voltage drive circuit as recited in claim 9, wherein said capacitor comprises a temperature compensated capacitor.

11. A voltage drive circuit as recited in claim 1, including a start of scan delay compensating circuit means for providing delay compensation for phase delays caused by said motor, such as phase delays caused by the winding inductance and rotor/load inertia.

12. A voltage drive circuit as recited in claim 1, further including a motor failure detecting circuit means for detecting when said stepper motor is in a nonoperative state, the output of which is used to limit the power input to a laser in said laser scanning device when the motor is in a nonoperative state.

13. A voltage drive circuit as recited in claim 12, wherein said motor failure detecting circuit means includes means for detecting when the back emf voltage of the stepping motor is within a preset voltage range.

* * * * *